(12) United States Patent
Girondi

(10) Patent No.: US 12,146,429 B2
(45) Date of Patent: Nov. 19, 2024

(54) BLOW-BY GAS FILTRATION ASSEMBLY WITH SUPPORT BEARING

(71) Applicant: UFI FILTERS S.P.A., Porto Mantovano (IT)

(72) Inventor: Giorgio Girondi, Porto Mantovano (IT)

(73) Assignee: UFI FILTERS S.P.A., Porto Mantovano (IT)

(*) Notice: Subject to any disclaimer, the term of this patent is extended or adjusted under 35 U.S.C. 154(b) by 303 days.

(21) Appl. No.: 17/795,165

(22) PCT Filed: Apr. 2, 2021

(86) PCT No.: PCT/IB2021/052768
§ 371 (c)(1),
(2) Date: Jul. 25, 2022

(87) PCT Pub. No.: WO2021/205302
PCT Pub. Date: Oct. 14, 2021

(65) Prior Publication Data
US 2023/0054374 A1    Feb. 23, 2023

(30) Foreign Application Priority Data
Apr. 8, 2020  (IT) ................. 102020000007468

(51) Int. Cl.
*B01D 46/18*        (2006.01)
*B01D 46/00*        (2022.01)
(Continued)

(52) U.S. Cl.
CPC ......... *F01M 13/04* (2013.01); *B01D 46/0056* (2013.01); *B01D 46/10* (2013.01);
(Continued)

(58) Field of Classification Search
CPC ........... F01M 13/04; F01M 2013/0422; F01M 2013/0438; B01D 46/0056; B01D 46/2411; B04B 5/005; Y10S 210/17
(Continued)

(56) References Cited

U.S. PATENT DOCUMENTS 6,152,120 A * 11/2000 Julazadeh ............... F01M 13/04
                                                    123/572
6,213,929 B1 * 4/2001 May ......................... B04B 9/06
                                                    494/24
(Continued)

FOREIGN PATENT DOCUMENTS

WO        2019/226608 A1    11/2019

OTHER PUBLICATIONS

International Search Report and Written Opinion of the International Searching Authority for International Patent Application No. PCT/IB2021/052768 mailed Jun. 18, 2021, 10 pages.

*Primary Examiner* — Long T Tran
*Assistant Examiner* — James J Kim
(74) *Attorney, Agent, or Firm* — Merchant & Gould P.C.

(57) ABSTRACT

A blow-by gas filtration assembly has an axis and includes an assembly body including a filtration chamber, an inlet mouth for filtering the blow-by gases, and an outlet mouth for the filtered blow-by gases. A filter group includes a central cavity radially crossed by blow-by gases. An electric drive operatively connects to the filter group to command rotation about the axis and filtration, and includes an electric motor including a stator and rotor. An axial shaft includes a filter portion mounting the filter group, a command portion mounting the rotor, and a support portion axially between the filter and command portions. A support bearing radially engages the support portion and the assembly body. The filter assembly screwably engages the filter group and filter portion, by respective filter and shaft threads so the filter (Continued)

group screws to the shaft until the support bearing is axially engaged.

21 Claims, 8 Drawing Sheets

(51) Int. Cl.
    *B01D 46/10*     (2006.01)
    *B01D 46/26*     (2006.01)
    *B01D 46/60*     (2022.01)
    *F01M 13/04*     (2006.01)
    *F16C 17/02*     (2006.01)

(52) U.S. Cl.
    CPC .............. *B01D 46/26* (2013.01); *B01D 46/60* (2022.01); *F16C 17/022* (2013.01); *B01D 2265/029* (2013.01); *B01D 2279/35* (2013.01); *F01M 2013/0438* (2013.01)

(58) Field of Classification Search
    USPC .......................................................... 55/400
    See application file for complete search history.

(56) References Cited

U.S. PATENT DOCUMENTS

| | | | |
|---|---|---|---|
| 10,537,842 B2 * | 1/2020 | Parikh | ................... B01D 45/14 |
| 2018/0169556 A1 | 6/2018 | Parikh et al. | |
| 2018/0236387 A1 | 8/2018 | Parikh et al. | |

* cited by examiner

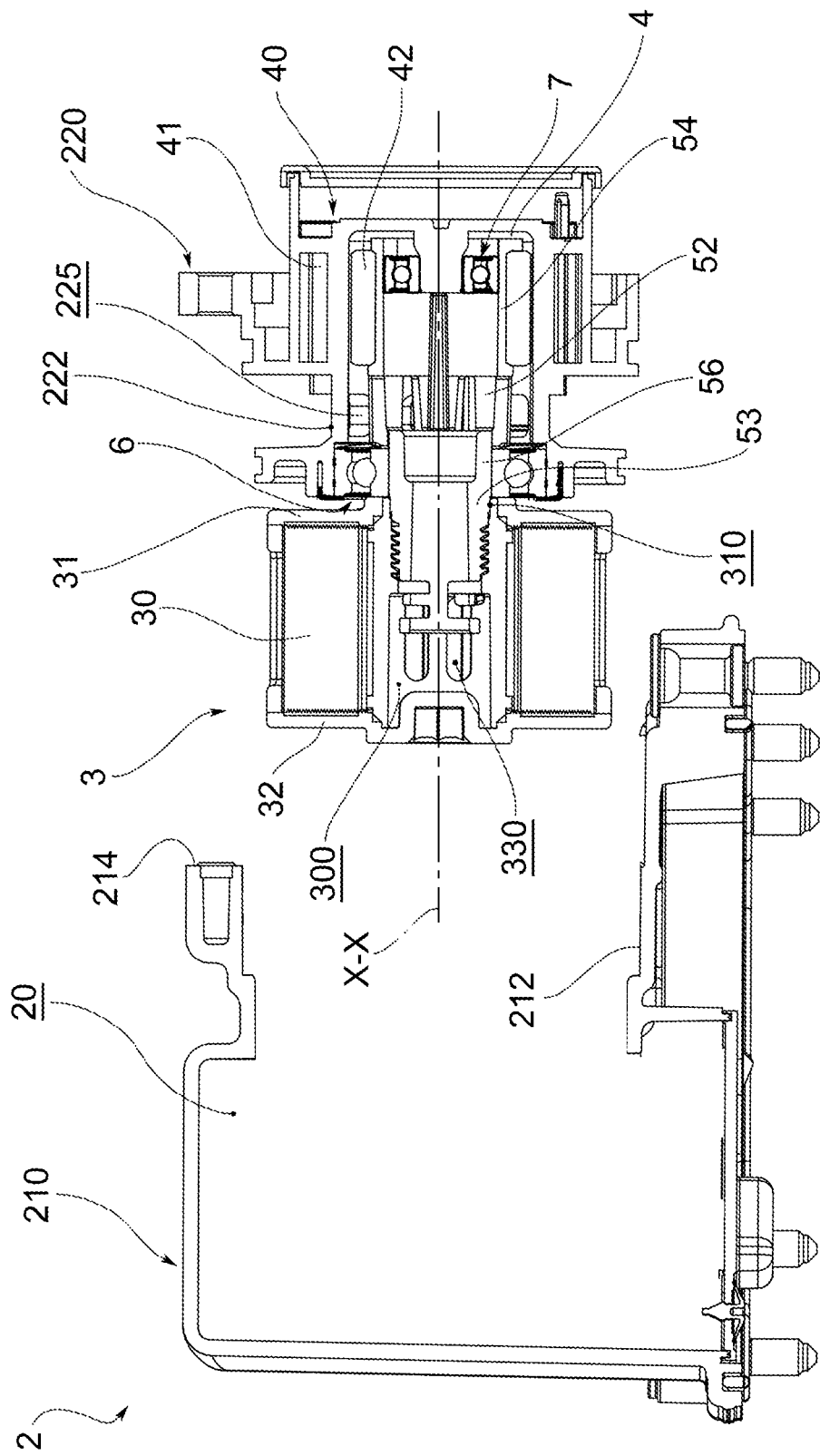
FIG.2"

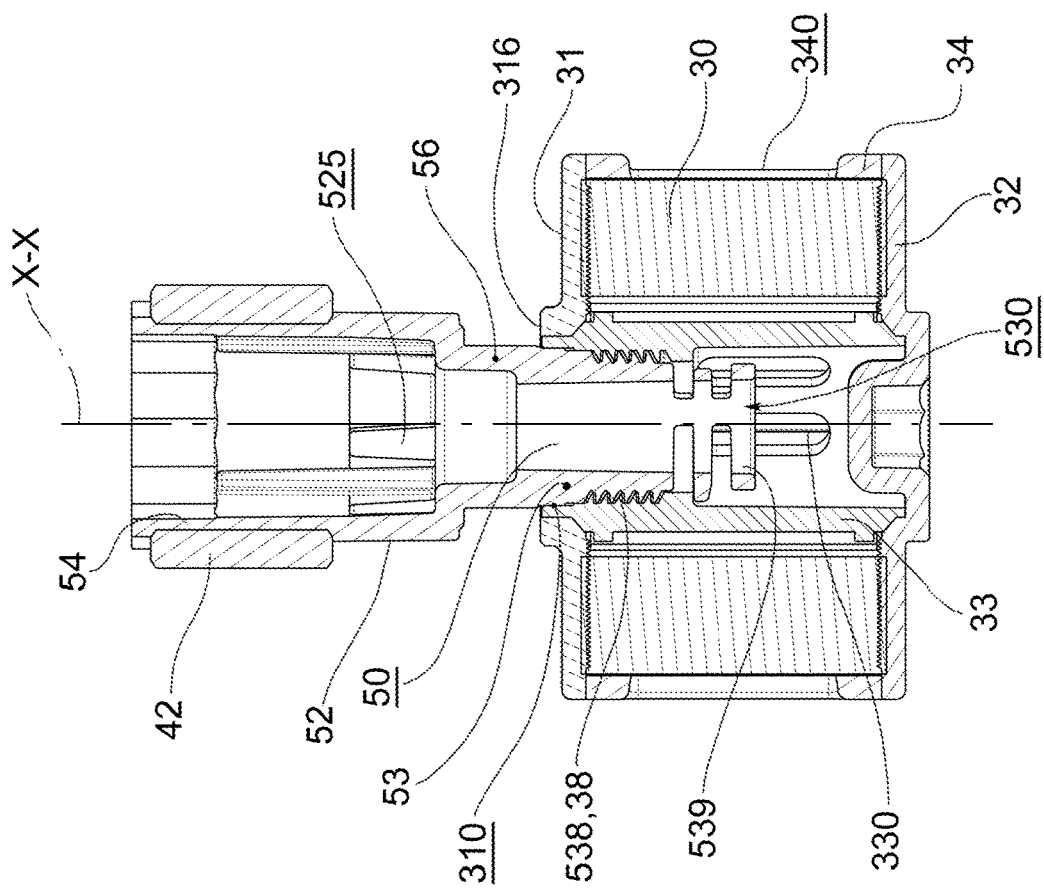
FIG.4"
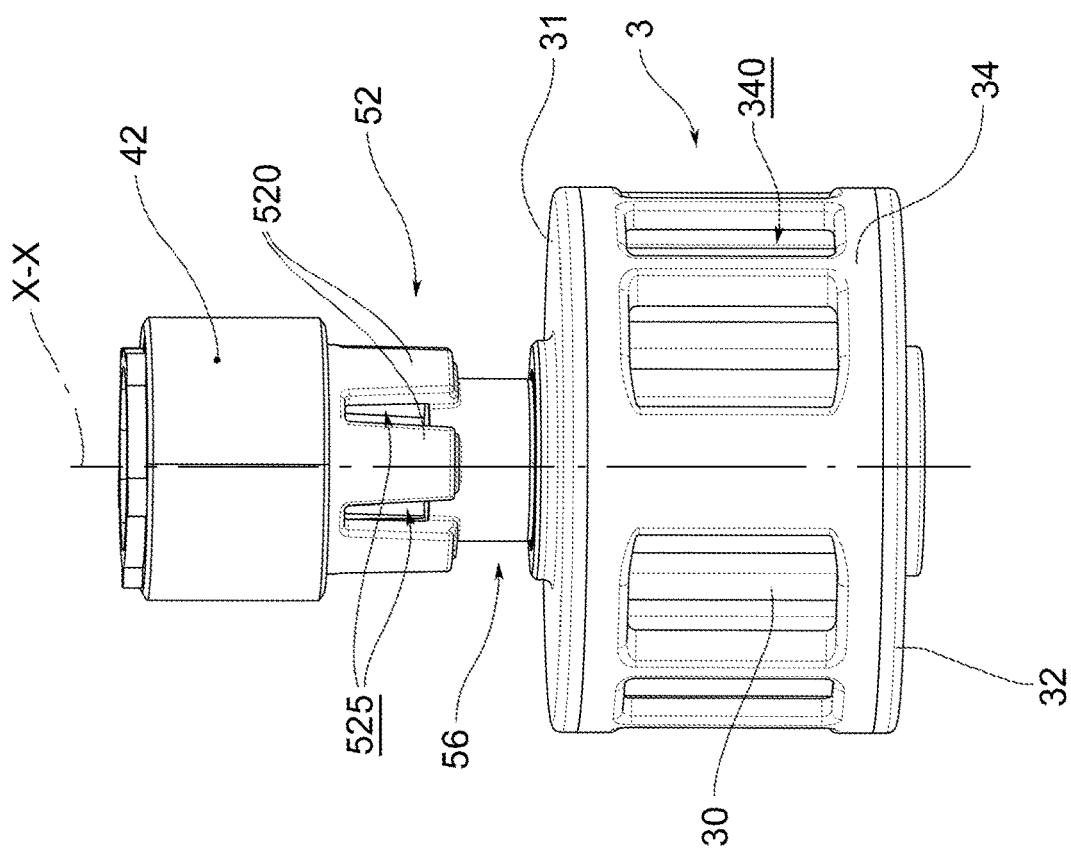
FIG.4'

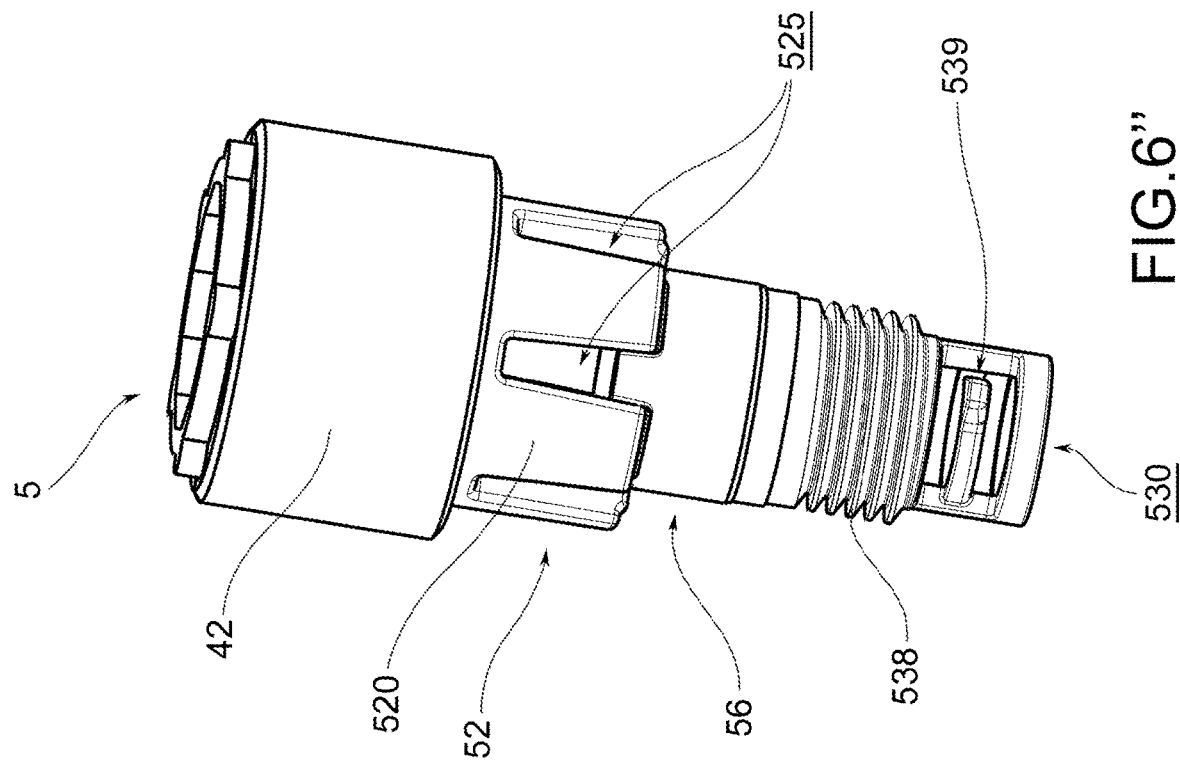
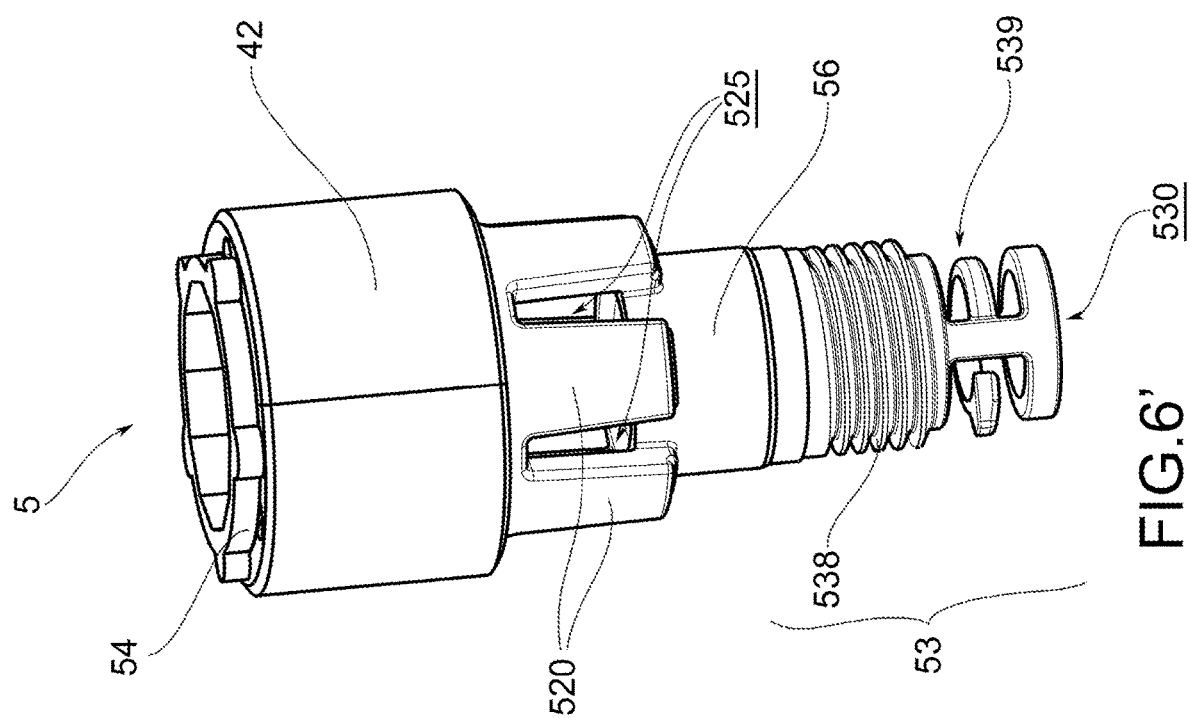

BLOW-BY GAS FILTRATION ASSEMBLY WITH SUPPORT BEARING

CROSS-REFERENCE TO RELATED APPLICATIONS

This application is a National Stage Application of PCT/IB2021/052768, filed 2 Apr. 2021, which claims benefit of Ser. No. 10/202,0000007468, filed 8 Apr. 2020 in Italy, and which applications are incorporated herein by reference. To the extent appropriate, a claim of priority is made to each of the above-disclosed applications.

FIELD OF APPLICATION

The present invention relates to a blow-by gas filtration assembly.

In particular, the blow-by gas filtration assembly of the present invention is fluidly connectable to the crankcase ventilation circuit of an internal combustion engine system inside of a vehicle to receive blow-by gases (from said crankcase) and filter from them the suspended particles contained therein.

Specifically, "blow-by gas" means oil vapours vented from the crankcase of an internal combustion engine during its operation. In particular, said blow-by gases have a composition similar to that of exhaust gases and are generated by combustion of the air/fuel mixture in the combustion chamber. Instead of reaching the exhaust gas emission circuit, these gases leak into the lower portion of the crankcase, passing alongside the cylinders and bringing carbon particles and oil drops with them. In the present discussion, for the sake of simplicity, blow-by gases are considered to consist of air and suspended particles; said suspended particles comprise oil droplets and/or carbonaceous particulates.

STATE OF THE ART

In the state of the art, solutions of filtration assemblies that is fluidly connectable to the crankcase and suitable for venting it from blow-by gases are known of.

Specifically, blow-by gas filtration assembly solutions which separate unwanted suspended particles from the aforesaid blow-by gases are known of, comprising a filter group having such purpose.

In the state of the art, a plurality of embodiments of filtration assemblies comprising a filter group comprising a porous-type filter medium, driven in rotation by a specific electric drive such that the suspended particles are separated from the air both by passing through the porous material and by the action of the centrifugal force are known of.

In some known embodiments, the filtration assembly comprises a special electric drive engaged to said filter group to command it in rotation.

These embodiments, typically present complex and imprecise engagement means between the electric drive and the filter group. This typically entails complex assembly methods, but above all difficulty in obtaining a filtration assembly in which the electric drive and filter group are correctly aligned with respect to the axis of rotation.

Solution According to the Invention

In the aforesaid state of the art the need is therefore strongly felt to have a blow-by gas filtration assembly that solves such problems.

The purpose of the present invention is to provide a new embodiment of a blow-by gas filtration assembly with simplified and certain reciprocal positioning of the filter group and the electric drive.

DESCRIPTION OF THE DRAWINGS

Further characteristics and advantages of the invention will, in any case, be evident from the description given below of its preferred embodiments, made by way of a non-limiting example with reference to the appended drawings, wherein:

FIG. 2" shows a cross-section view in separate parts of FIG. 2';

FIGS. 4' and 4" respectively show a side view and a cross-section view of the components shown in FIG. 3 in an assembled configuration;

FIGS. 6' and 6" are two perspective views of the shaft mounting a rotor shown in FIG. 5a;

DETAILED DESCRIPTION

Figure 1:
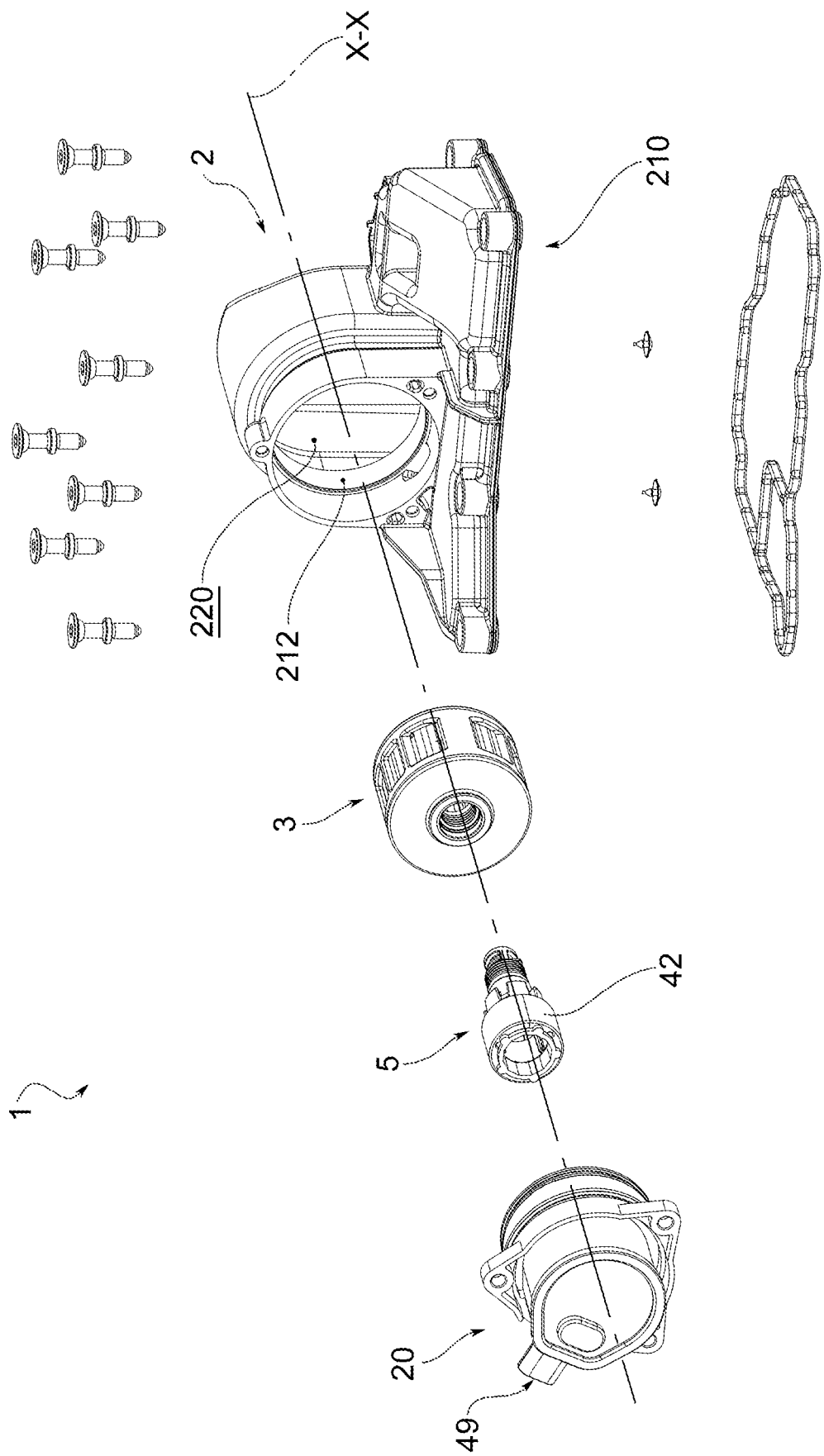
FIG. 1 shows a perspective view in separate parts of the blow-by gas filtration assembly according to the present invention, according to a preferred embodiment.
Figure 2:
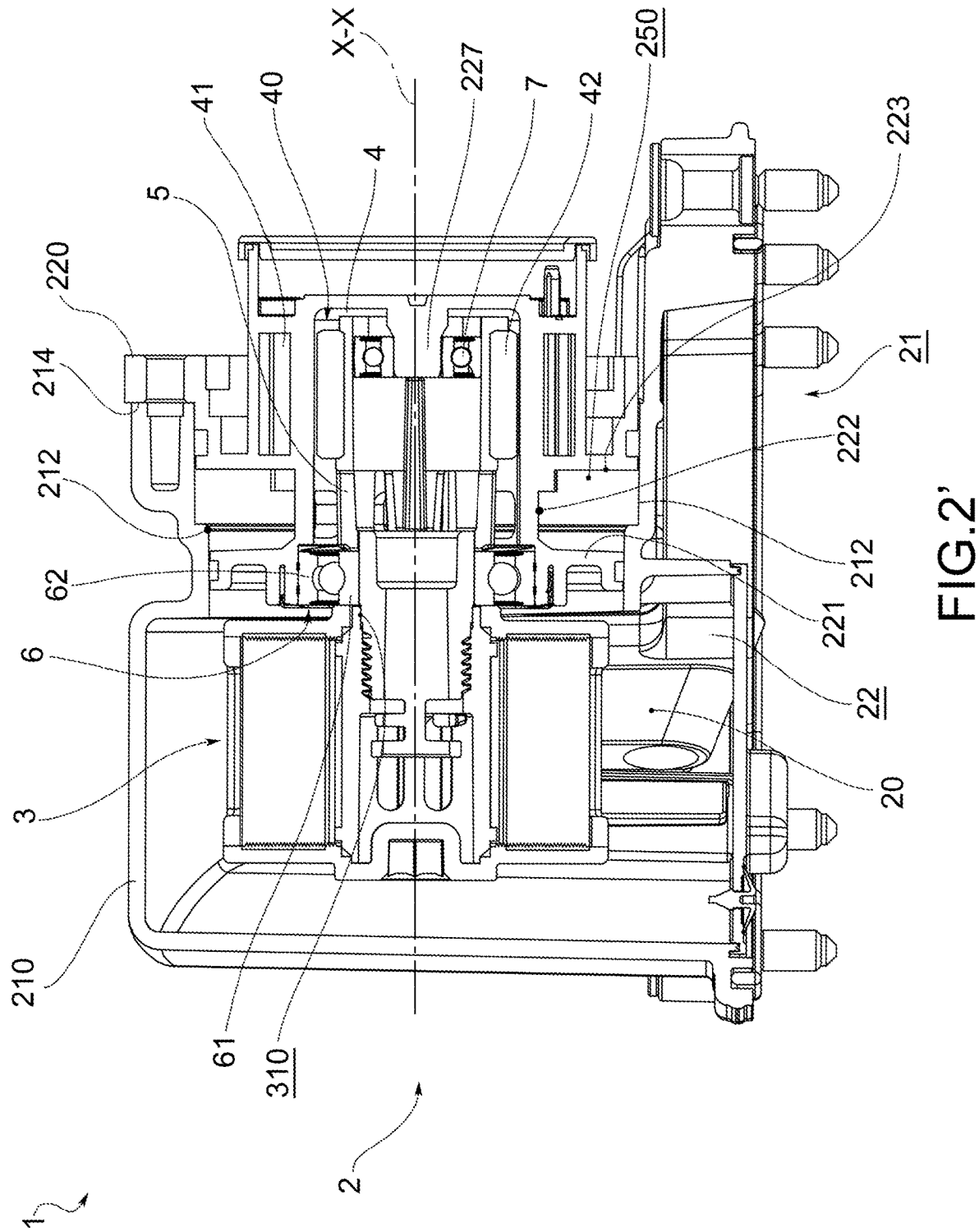
FIG. 2' shows a cross-section view of the blow-by gas filtration assembly in FIG. 1 in an assembled configuration.
Figure 3:
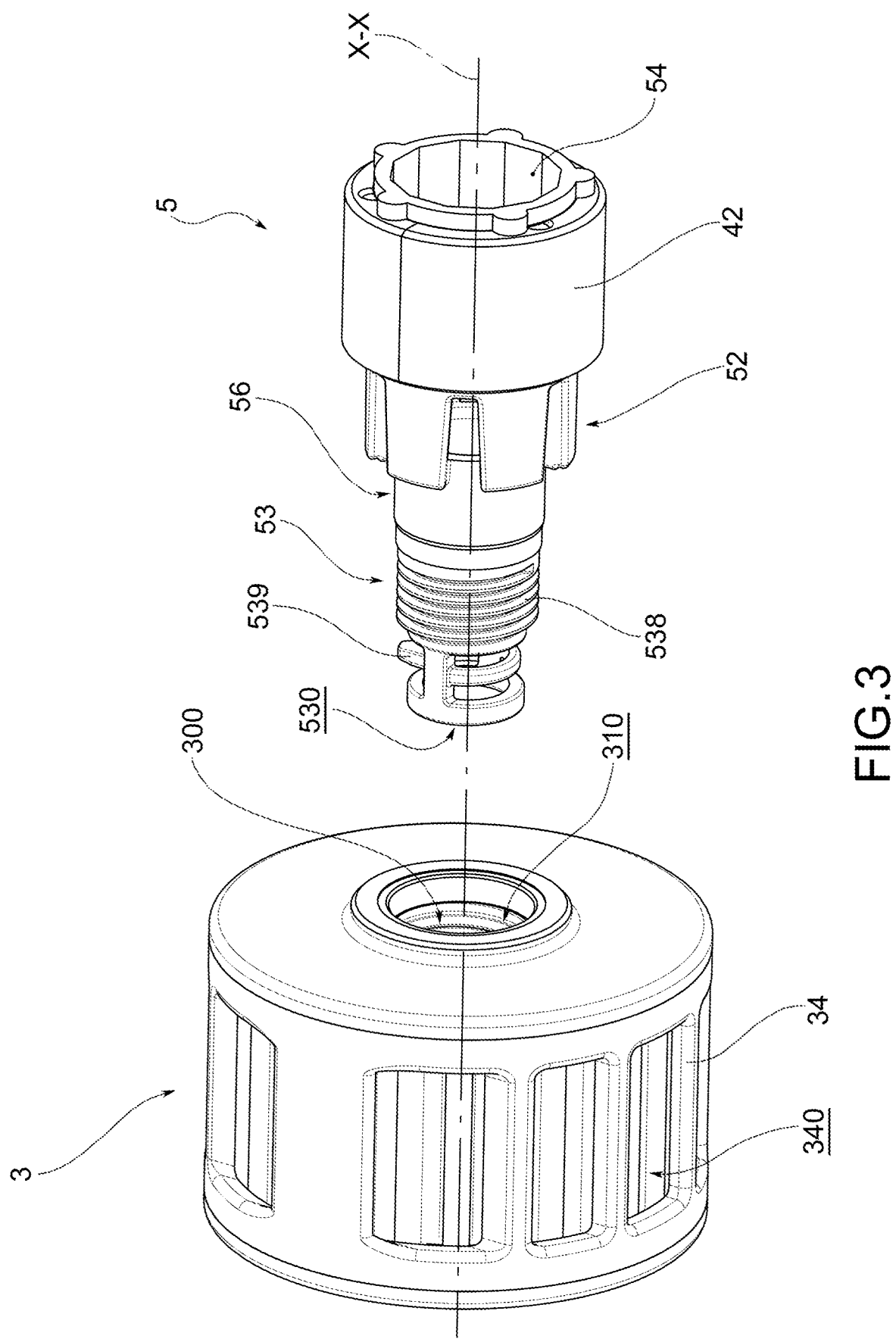
FIG. 3 shows a perspective view in separate parts of some components included in the blow-by gas filtration assembly.
Figure 5A:
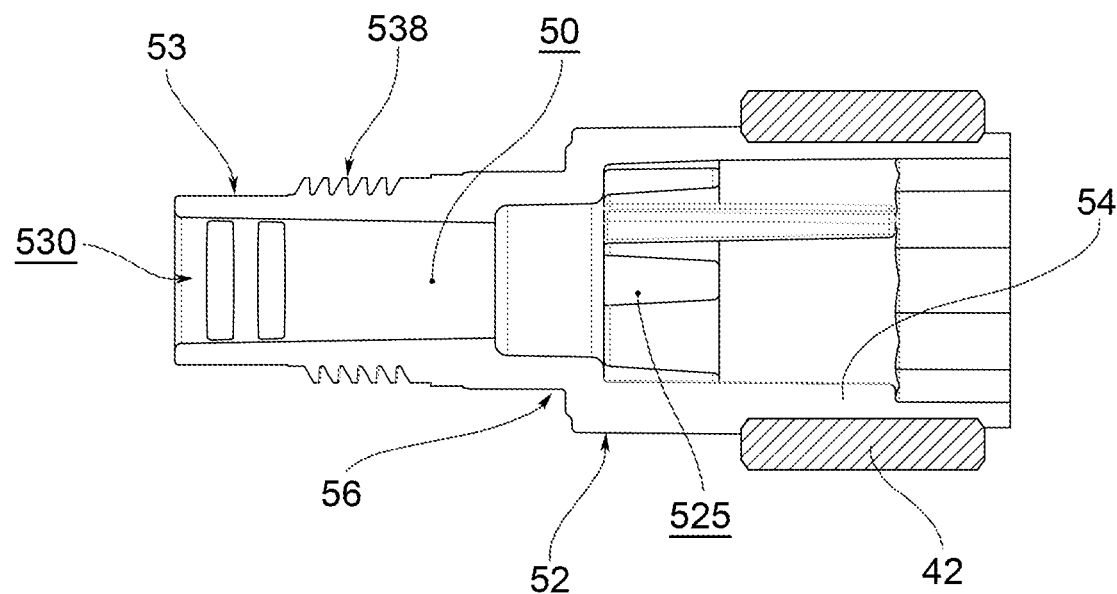
FIG. 5a is a cross-section view of a shaft mounting a rotor comprised in the blow-by gas filtration assembly according to a preferred embodiment of the present invention.
Figure 5B:
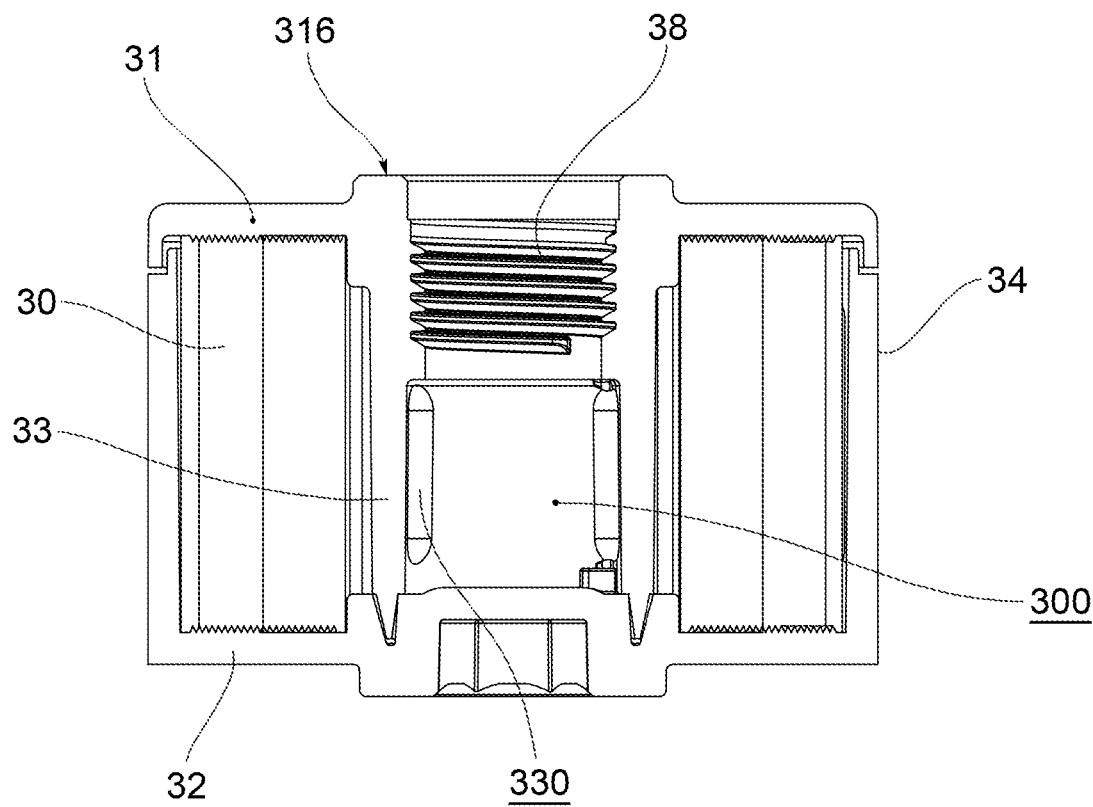
FIG. 5b is a cross-section view of a filter group comprised in the blow-by gas filtration assembly according to a preferred embodiment of the present invention.
Figure 7:
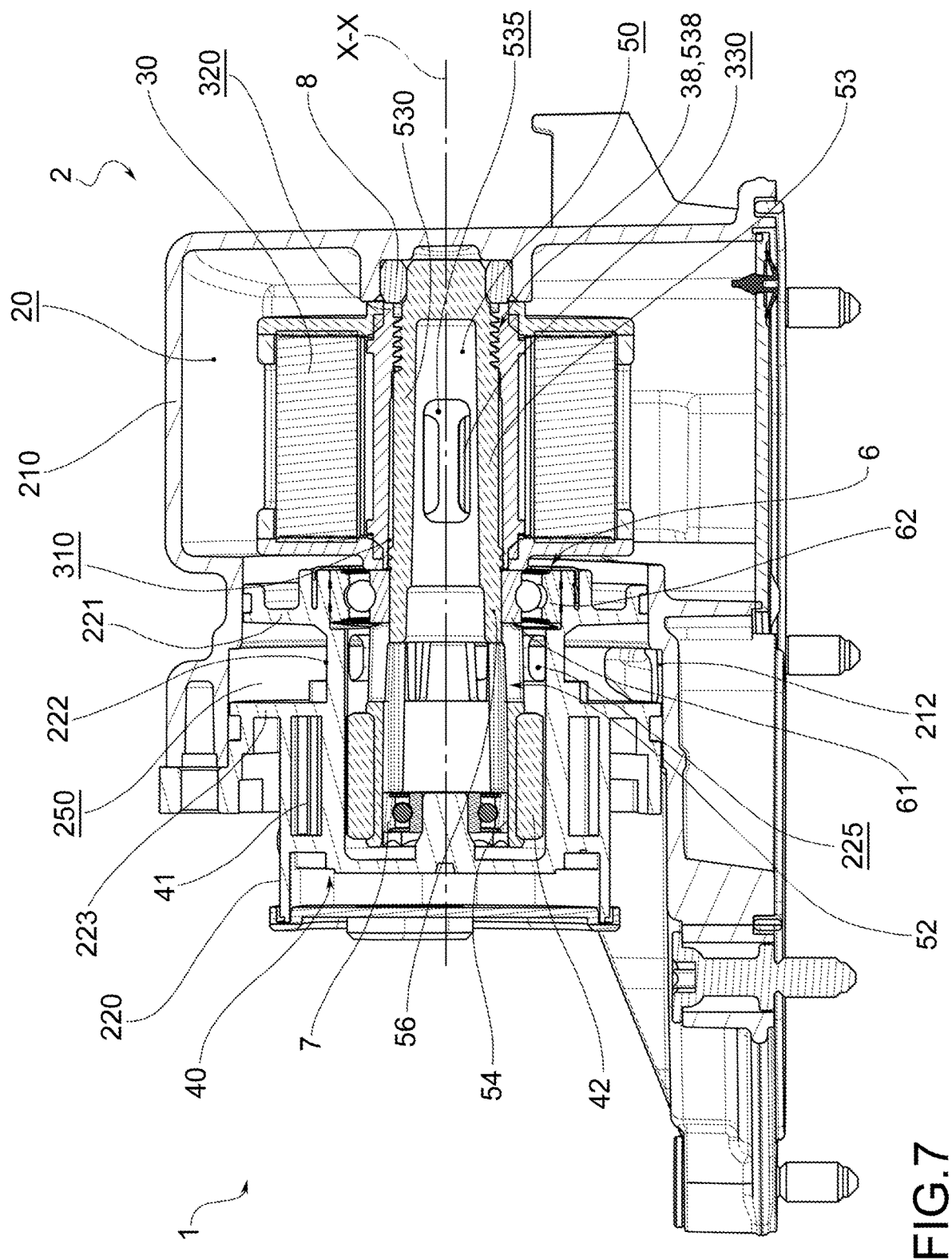
FIG. 7 shows a cross-section view of a blow-by gas filtration assembly according to the present invention, according to a preferred embodiment.

With reference to the appended drawings, reference numeral 1 denotes a blow-by gas filtration assembly suitable for performing a filtration/separation action on particles (liquid and/or solid) suspended in the gas stream.

Said blow-by gas filtration assembly 1 is fluidly connectable to a crankcase ventilation circuit of an internal combustion engine of a vehicle to receive blow-by gases and filter from them the suspended particles contained therein returning a stream of clean gas (i.e. filtered) to other vehicle systems such as, for example, to the engine air intake circuit communicating with the combustion chamber of the internal combustion engine.

Preferably, said blow-by gas filtration assembly 1 is directly mountable to the crankcase of an internal combustion engine of a vehicle. In particular, the present invention is not limited to this feature; in one embodiment the blow-by gas filtration assembly 1 is a stand-alone device comprising respective inlet and outlet ports communicating respectively with the crankcase, for receiving blow-by gases to be filtered, and with the air intake circuit, for recirculating the gas stream filtered of solid and liquid particles towards the combustion chamber.

According to the present invention, the filtration assembly 1 comprises an X-X axis with respect to which the components described below extend or are positioned.

According to a preferred embodiment, the blow-by gas filtration assembly 1 comprises an assembly body 2. Preferably, the other components of the system are positioned in or on said assembly body 2, as described extensively below and evident from the exemplary figures attached below.

In particular, the assembly body 2 comprises a filtration chamber 20 in which filtration/separation operations of the blow-by gases take place. The filtration chamber 20 is therefore fluidly connected to the crankcase ventilation circuit of an internal combustion engine of a vehicle to receive dirty blow-by gases, i.e. comprising suspended particles (solid and/or liquid), and emit clean blow-by gases, i.e. cleaned of suspended particles, into the engine air intake system.

According to a preferred embodiment, the assembly body 2 comprises respective blow-by gas inlets and outlets.

Preferably, the assembly body 2 comprises an inlet mouth 21 fluidically connected with the crankcase ventilation circuit of a vehicle to receive the blow-by gases to be filtered. Preferably, said inlet mouth is made radially, spaced apart from the X-X axis, for example substantially parallel thereto. Preferably, said inlet mouth is made on the side wall of the assembly body 2. Preferably, said inlet mouth is made on the wall of the assembly body 2 defining the filtration chamber 20.

In addition, preferably, the assembly body 2 comprises an outlet mouth 22. Said outlet mouth 22 is radially spaced apart from the X-X axis, for example substantially parallel thereto.

According to a preferred embodiment, said outlet mouth 22 is made on the coupling flange of the assembly body 2 to the internal combustion engine crankcase. Preferably, the outlet mouth 22 and the inlet mouth 21 are mutually spaced along the X-X axis. Preferably, the outlet mouth 22 and the inlet mouth 21 are mutually axially parallel.

Furthermore, according to a preferred embodiment, the assembly body 2 comprises a main body 210 and an auxiliary body 220 mutually engageable as amply described below and as shown by way of example in the attached figures.

According to the present invention, the blow-by gas filtration assembly 1 comprises a filter group 3, specifically suitable for performing said filtration/separation operations of the particles suspended in the blow-by gases. Said filter group 3 is positionable and operates in the filtration chamber 20.

The filter group 3 extends along the X-X axis comprising a central cavity 300.

According to a preferred embodiment, the filter group 3 has a substantially cylindrical shape.

The filter group 3 is crossable radially by blow-by gases.

According to the present invention, the filter group 3 is crossable by the blow-by gases in the radial direction. Preferably, the filter group 3 is crossable by blow-by gases radially from the outside towards the inside.

Preferably, the inlet mouth 21 is radially facing the filter group 3. According to a preferred embodiment, the inlet mouth is radially facing the outer surface of the filter group 3.

Preferably, the outlet mouth 22 is, in turn, substantially radially facing the filter group 3.

In other words, the filter group 3 identifies, in the filtration chamber 20, a dirty side in which there are blow-by gases to filter and a clean side in which there are filtered blow-by gases. The inlet mouth 21 is fluidically connected with said dirty side, the outlet mouth 22 is fluidically connected with said clean side.

According to a preferred embodiment, the filter group 3 comprises a filter medium 30. The filter medium 30, which is crossable radially comprises a non-woven fabric pleated in the form of a star or a porous cylindrical septum.

Moreover, according to a preferred embodiment, the filter group 3 comprises a first filter plate 31 and a second filter plate 32 mutually arranged at the axial ends of the filter medium 30.

According to a preferred embodiment, the filter group 3 comprises a central structure 33 which is housed inside the filter medium 30 and joins the two filter plates 31, 32, so that the filter plates 31, 32 are integrally connected in rotation. Preferably, said central structure 33 has a plurality of radial through openings 330 suitable to allow the passage of the fluid being filtered.

According to a preferred embodiment, the central structure 33 is a stand-alone component that is mountable on the first filter plate 31 and the second filter plate 32.

According to other embodiments variants, the central structure 33 is made in one piece with the first filter plate 31 or the second filter plate 32.

In addition, according to a preferred embodiment, the filter group 3 comprises an outer structure 34 which surrounds the filter medium 30 on the outside and joins the two filter plates 31, 32. Preferably, said outer structure 34 has, in turn, a plurality of radial through openings 340 suitable to allow the passage of the blow-by gases.

According to a preferred embodiment, the cavity 300 extends through at least one plate, preferably through the first filter plate 31. In a preferred embodiment, the second filter plate 32 is closed. In one embodiment variant, the second filter plate 32 in turn has an opening.

According to the present invention, moreover, the filtration assembly 1 comprises a command drive operatively connected to the filter group 3 to command it in rotation about the X-X axis.

According to the present invention, moreover, the filtration assembly 1 comprises an electric drive 4 operatively connected to the filter group 3 to command it in rotation about the X-X axis.

According to a preferred embodiment, the electric drive 4 comprises an electric motor unit 40 comprising a stator 41 and a rotor 42. The actuation of the stator 41 results in the rotation of the rotor 42. In particular, the circulation of electric current in the windings of the stator 41 determines a rotating magnetic field capable of determining the rotation of the rotor 42, and therefore of the components connected to it such as the filter group 3. According to a preferred embodiment, the electric motor group 40 is of the brushless type.

According to a preferred embodiment, the electric motor makes it possible to vary the rotation speed of the filter group 3 according to the operating conditions of the vehicle.

According to a preferred embodiment, the electric drive 4 is electrically connected to a vehicle command unit, ECU, to command the operation of the filtration assembly 1 according to the operating needs of the vehicle. Preferably, the electric drive 4 is electrically connected to the ECU vehicle command unit by means of an electrical connector 49, preferably integrated in the auxiliary body 220 of the assembly body 2.

According to a preferred embodiment, the electric drive 4 comprises an electronic card to communicate with the vehicle command unit to command the operation of the filtration assembly according to the operating conditions of the vehicle.

According to a preferred embodiment, the rotor 42 comprises one or more elements in ferromagnetic material arranged in the shape of a toroid.

According to the present invention, the blow-by gas filtration assembly 1 comprises a support and command shaft 5.

Such shaft 5 extends along the X-X axis and is specially suitable to be operatively connected to the filter group 3 and the electric drive 4.

According to a preferred embodiment, as described below and as shown in the appended drawings, the shaft 5 extends inside the filter group 3 and inside the electric drive 4.

According to a preferred embodiment, the shaft 5 comprises within it at least one air duct 50 through which the blow-by gases flow.

According to a preferred embodiment, said air duct 50 extends axially through the entire shaft 5. In other words, the shaft 5 is a hollow body.

According to an embodiment variant, said air duct 50 extends axially through only a portion of the shaft 5.

According to a preferred embodiment, the shaft 5 is made as a single component.

According to a preferred embodiment, the shaft 5 is made as a single component in a thermoplastic material.

According to an alternative embodiment, the shaft is a hollow body composed of two or more parts mechanically couplable to each other (e.g. by welding, mechanical couplings, screws or the like) reversibly or irreversibly so as to form a single component the constituent parts of which rotate synchronously upon command by the electric drive 4.

According to the present invention, the shaft 5 comprises distinct portions with different purposes and, above all, suitable to engage or to be engaged by distinct components.

According to the present invention, the shaft comprises a filter portion 53 on which the filter group 3 is mounted. Preferably, in said filter portion 53 the blow-by gases flow, being fluidically connected to the cavity 300; in said filter portion 53 the air duct 50 extends.

According to the present invention, moreover, the shaft 5 comprises a command portion 54 operatively connected to the electric drive 4. In other words, the shaft 5 comprises a command portion 54 suitable to interact with the electric drive 4 to determine the rotation of the shaft 5 and the filter group 3 connected to it. In particular, the rotor 42 is mounted on said command portion 54.

In particular, according to the present invention, the rotor 42 and the filter group 3 are mounted integrally to the shaft 5 respectively to the command portion 54 and to the filter portion 53 in such a way that a commanded rotation of the rotor 42 corresponds to a rotation of the shaft 5 and thus of the filter group 3. In particular, in the present description, "integrally" means that the rotor 42 and the filter group 3 are mechanically connected to the shaft 5 to rotate in unison (or synchronously).

According to a preferred embodiment, the rotor 42 is integrated on the shaft 5, the latter preferably made of thermoplastic material, by overmoulding.

According to a preferred embodiment, the rotor 42 is integrated on the shaft 5 by shape coupling or by interference.

According to the present invention, the blow-by gas filtration assembly 1 comprises a support bearing 6 suitable to support the shaft 5 to the assembly body 2 in such a way as to keep it centred to the X-X axis and allow its rotation with respect to the assembly body 2.

In particular, the shaft 5 comprises a bearing portion 56 on which said support bearing 6 is mounted.

The support bearing 6 is radially engaged to the support portion 56 and externally to the assembly body 2.

In particular, the support bearing 6 comprises an inner bearing ring 61 and an outer bearing ring 62.

Preferably, said inner bearing ring 61 is engaged to the shaft 5 and said outer bearing ring 62 is engaged to the assembly body 2.

According to the present invention, said support portion 56 is axially positioned between the filter portion 53 and the command portion 54.

In particular, according to the present invention, the filter group 3 comprises a filter thread 38 and the filter portion 53 of the shaft 5 comprises a shaft thread 538 mutually engageable upon screwing.

According to the present invention, in the screwing engagement between the filter group 3 and filter portion 53 and the resulting reciprocal displacement in the axial direction, the filter group 3 engages the support bearing 6. Preferably, the filter group 3 axially engages the support bearing 6.

Preferably, the axial engagement of the filter group 3 with the support bearing 6 prevents further screwing of the filter group 3 on the shaft 5.

Preferably, the axial engagement of the filter group 3 with the support bearing 6 prevents further movements of the support bearing 6.

Preferably, the axial engagement of the filter group 3 with the support bearing 6 keeps the position of the support bearing 6 fixed in relation to the assembly body 2.

Preferably, upon screwing, the filter group 3 discharges a closing torque onto the support bearing 6. In other words, the support bearing 6 acts as an axial shoulder to the filter group 3. In other words, the support bearing 6 acts as an end stop to the rotation when the filter group 3 is screwed onto the shaft 5.

Preferably, the axial engagement of the filter group 3 with the support bearing 6 allows the necessary closing torque to be achieved to ensure the synchronous rotation of the filter group 3 with the shaft 5.

According to the present invention, moreover, in the screwing engagement between the filter group 3 and filter portion 53 and the resulting reciprocal displacement in the axial direction, the filter group 3 engages and axially blocks the support bearing 6.

Preferably, the filter group 3 comprises an annular shoulder 316 suitable to engage the inner bearing ring 61 of the support bearing 6. In particular, said annular shoulder 316 is suitable to engage a surface extending radially inside the inner bearing ring 61. That is to say that said annular shoulder 316 engages an inner bearing ring shoulder 61.

Preferably, the filter group 3 comprises an annular shoulder 316 suitable to engage the inner bearing ring 61 of the support bearing 6, preferably to axially contact the inner bearing ring 61 of the support bearing 6.

According to a preferred embodiment, the annular shoulder 316 is a planar surface arranged at least in part on a plane transverse to the X-X axis, preferably orthogonal to the X-X axis, suitable to at least partially engage the support bearing 6, preferably the inner bearing ring 61 of the support bearing 6.

According to a further preferred embodiment, the annular shoulder 316 is an undulated or knurled or irregular surface arranged at least partially on a plane transverse to the X-X axis, preferably orthogonal to the axis X-X, suitable to at least partially engage the support bearing 6, preferably the inner bearing ring 61 of the support bearing 6

According to a further preferred embodiment, the annular shoulder 316 is an abutment surface arranged at least in part on a plane transverse to the X-X axis, preferably orthogonal to the X-X axis, formed by a series of reciprocally spaced ribs, preferably equidistant, positioned on the filter group for example on the first plate or the central structure.

According to a preferred embodiment, the annular shoulder 316 is comprised in the first filter plate 31. Preferably, the annular shoulder 316 surrounds the first plate opening 310.

According to a preferred embodiment, the annular shoulder 316 is comprised in the central structure 33. Preferably, the annular shoulder 316 surrounds the first plate opening 310.

Preferably, the annular shoulder 316 extends in height parallel to the X-X axis.

Preferably, the annular shoulder 316 has a thickness that extends radially with respect to the X-X axis.

According to a preferred embodiment, the screwing between filter thread 38 and shaft thread 538 involves the axial translation of the filter 3 and the engagement of the annular shoulder 316 with the bearing 6 by performing a tightening action on it.

According to a preferred embodiment, the filter thread 38 is the lead screw and the shaft thread 538 is the screw.

According to a preferred embodiment, the filter thread 38 is the screw and the shaft thread 538 is the lead screw.

According to a preferred embodiment, the filter group 3 is screwed to the shaft 5 in a rotary direction opposite the rotary direction in which the shaft 5 and therefore the filter group 3 is driven in rotation by the electric drive 4 during filtration operations.

According to a preferred embodiment, the support bearing 6 is positioned on the shaft 5 in a defined axial position, being on one side engaged by the filter group 3 and on the other side engaged by the rotor 42 or at least one shaft abutment element 520 or by the assembly body 2.

In other words, the support bearing 6 is sandwiched between the filter group 3 and an axially fixed abutment present on the shaft 5. That is to say, the support bearing 6 is clamped onto the shaft 5.

According to a preferred embodiment said fixed abutment is made integrally with the shaft 5. Preferably, the shaft 5 comprises at least one shaft abutment element 520 suitable to perform the function of fixed abutment for the support bearing 6.

According to a preferred embodiment said fixed abutment is realised by the rotor 42 integrally mounted to the shaft 5.

According to yet a further preferred embodiment, said fixed abutment is realised by the assembly body 2.

According to a preferred embodiment, said fixed abutment is suitable to axially engage the inner bearing ring 61 of the support bearing 6.

According to a preferred embodiment the shaft 5 further comprises an outflow portion 52 fluidically connected to the air duct 50 and comprising at least one outflow window 525 through which the blow-by gases flow.

According to a preferred embodiment, therefore, the air duct 50 extends at least between the filter portion 53 and the outflow portion 52. According to a preferred embodiment, in which the filter is crossed in a radial direction from the outside to the inside, the filtered blow-by gases flow through the filter portion 53 towards the outflow portion 52. According to a preferred embodiment, the outflow portion 52 is axially positioned between the filter portion 53 and the command portion 54.

Preferably, the outflow portion 52 is axially positioned between the support portion 56 and the command portion 54. In other words, the support portion 56 is positioned axially between the filter portion 53 and the outflow portion 52.

According to a preferred embodiment, wherein the outflow portion 52 comprises a plurality of outflow windows 525 arranged annularly around the X-X axis, wherein each window 525 is separated from the consecutive window by a shaft abutment element 520.

According to a preferred embodiment, the outflow portion 52 acts as an axial abutment for the support bearing 6.

According to a preferred embodiment, the second filter plate 32 is closed and the shaft 5 crosses the first plate 31 along the X-X axis through a respective first plate opening 310.

Preferably, the filter portion 53 comprises at least one air intake 530 through which the blow-by gases flow.

In other words, said air intake 530 fluidically connects the air duct 50 and the cavity 300.

Preferably, the filter portion 53 comprises at an axial end thereof an air intake 530 through which the blow-by gases flow. Preferably, said air intake 530 is positioned orthogonally to the X-X axis. Preferably, said air intake 530 is positioned parallel to the X-X axis. Preferably, said air intake 530 has a plurality of openings, orthogonally to the X-X axis and/or parallel to the X-X axis.

According to a preferred embodiment, instead, the second filter plate 32 has a second plate opening 320.

Preferably, the shaft 5 crosses said second plate opening 320 along the X-X axis.

According to a preferred embodiment, the shaft 5 engages the edges of said second plate opening 320. Preferably, said engagement between the shaft 5 and the second filter plate 32 is carried out by threading.

According to a preferred embodiment, the filter portion 53 comprises radial openings 535 suitable to place in fluidic communication the air duct 50 and the cavity 300.

According to a preferred embodiment, the shaft 5 sealingly engages the filter group 3 in two sealing regions.

Preferably, the radial openings 535 are positioned axially between the two sealing regions.

Preferably said two regions are positioned at the two filter plates 31, 32. Preferably, said engagement is achieved by two specific threaded couplings.

According to a preferred embodiment, said filter thread 38 is comprised in the first filter plate 31.

According to a preferred embodiment, said filter thread 38 is comprised in the second filter plate 32.

According to a preferred embodiment, said filter thread 38 is comprised in the central structure 33.

According to a preferred embodiment, the shaft 5, preferably in the filter portion 53, comprises an anti-rotation element 539 suitable to perform an action in the radial direction to engage the filter group 3 screwed to the shaft 5. In other words, the anti-rotation element 539 is suitable to prevent unscrewing between the filter group 3 and the shaft 5. In other words, the anti-rotation element 539 is suitable to prevent unwanted unscrewing of the threaded coupling.

According to a preferred embodiment, the anti-rotation element 539 is an elastically yielding element in a radial direction, during the screwing operations.

Preferably, the anti-rotation element 539 is suitable to snap-fit into a radial through opening 330 made on the central structure 33.

According to a preferred embodiment, the anti-rotation element 539 has inclined sliding surfaces specially shaped to facilitate the action in the radial direction.

Preferably, the anti-rotation element 539 has a first inclined sliding surface suitable to interact during the screwing operations. Furthermore, preferably, the anti-rotation element 539 has a second inclined sliding surface suitable to interact to allow unscrewing operations (which require a minimum initial rotation force).

According to a preferred embodiment, the inclination of the first inclined sliding surface is different from the inclination of the second inclined sliding surface. In particular, the two sliding surfaces are respectively inclined diversely from each other so as to adequately dimension the rotary force that allows screwing, the force maintaining the threaded coupling and the force that allows disengagement.

According to a preferred embodiment, the shaft 5 comprises a closing wall (not shown), inside the air duct 50 suitable to close said air duct 50 to force the outflow of the filtered blow-by gases through the at least one outflow window 525.

According to a preferred embodiment, the closing wall is positioned at the command portion 54, proximal to the outflow portion 52.

Preferably, said closing wall 55 is shaped to facilitate the outflow of blow-by gases towards the at least one outflow window 525.

As mentioned above, the assembly body 2 comprises a main body 210 and an auxiliary body 220 mutually sealingly engageable along the X-X axis.

Preferably, the coupling between the main body 210 and an auxiliary body 220 hermetically delimits the filtration chamber 20. Preferably, said filtration chamber 20 is housed in the main body 210 closed at one axial end by the auxiliary body 220.

Preferably, both the inlet mouth 21 and the outlet mouth 22 are comprised in the main body 210.

According to a preferred embodiment, the main body 210 and the auxiliary body 220 in the reciprocal coupling further delimit an outflow chamber 250 fluidically connected to the outflow portion 52 of the shaft 5 and preferably to the outlet mouth of the blow-by gases 22. Preferably, the outflow chamber 250 is sealingly separated from the filtration chamber 20, fluidically connected to the clean side of the filtration chamber by means of the shaft 5. Preferably, said outflow chamber 250 is fluidically connected to the clean side of the filtration chamber by means of the at least one outflow window 520.

According to a preferred embodiment, the outflow chamber 250 is at least partially housed in the main body 210.

Preferably, the outflow chamber 250 extends at least partially around the X-X axis. Preferably, the outflow chamber 250 has an annular extension.

According to a preferred embodiment, the outflow chamber 250 is radially delimited by a collar wall 222 of the auxiliary body 220 placed in a region proximal to the X-X axis and by a housing wall 212 comprised in the main body 210 placed in a region distal from the X-X axis.

Moreover, according to a preferred embodiment, the outflow chamber 250 is axially delimited by a bottom wall 221 and by a top wall 223 extending radially relative to the X-X axis.

Moreover, according to a preferred embodiment, the outflow chamber 250 is axially delimited by a bottom wall 221 and by a top wall 223 comprised in the auxiliary body 220, extending radially relative to the X-X axis starting from the collar wall 222.

According to a preferred embodiment, the outflow chamber 250 is fluidically connected to the outflow portion 52 by means of at least one body window 225 through which the blow-by gases coming out of the at least one outflow window 520, or in input towards the at least one outflow window 520, flow.

Preferably, the collar portion 222 comprises at least one body window 225.

According to a preferred embodiment, the collar portion 222 is annularly facing the shaft 5 at the at least one outflow window 520.

Preferably, therefore, the at least one outflow window 520 and the at least one body window 225 are radially aligned.

According to a preferred embodiment, both the bottom wall 221 and the top wall 223 sealingly engage the main body 210.

Preferably, as shown in the accompanying drawings, the top wall 223 engages the main body 210 in a radial direction. Preferably, proximal to the housing wall 212, the main body 210 comprises an abutment step 214 axially engageable by the secondary body 220.

Preferably, as shown in the accompanying drawings, the bottom wall 221 engages the main body 210 in a radial direction. Preferably, at one radial end thereof, the bottom wall 221 is suitable to house a gasket element.

According to a preferred embodiment, the outflow chamber 250 is shaped so as to facilitate the outflow of the blow-by gases.

According to a preferred embodiment, the outflow chamber 250 is shaped so as to facilitate the channelling towards the outlet mouth 22 of the filtered blow-by gases. Preferably, for example, the outflow chamber 250 is radially wider in a region distal from the X-X axis.

Preferably, in fact, the bottom wall 221 extends in a specially inclined radial direction, i.e. conically shaped.

According to a preferred embodiment, the shaft extends partially into the main body 210 and partially into the auxiliary body 220.

According to a preferred embodiment, the auxiliary body 220 comprises a stator housing 220' in which the stator 41 is housed.

Preferably, the stator 41 is inserted in the stator housing 220' in an axial direction.

Preferably, the stator 41 is integral with the auxiliary body 220. For example, the auxiliary body 220 integrates the stator 41 internally. Preferably, the auxiliary body 220 is made of thermoplastic material and the stator 41 is co-moulded together with the auxiliary body 220.

According to a preferred embodiment, the support bearing 6, preferably the outer bearing ring 62, axially engages the auxiliary body 220 on the opposite side to the filter group 3.

Preferably, the support bearing 6 engages the collar wall 222.

According to a preferred embodiment, the blow-by gas filtration assembly 1 comprises an upper auxiliary support bearing 7 engaged to the shaft 5 to support it to the assembly body 2.

According to a preferred embodiment, the upper auxiliary support bearing 7 is positioned axially spaced from the support bearing 6.

According to a preferred embodiment, the upper auxiliary support bearing 7 is positioned engaged to the shaft 5 near the electric drive 4, for example engaging the auxiliary body 220.

According to a preferred embodiment, the upper auxiliary support bearing 7 is engaged to the command portion 54.

According to a preferred embodiment the upper auxiliary support bearing 7 is housed inside the command shaft 5. Preferably, the upper auxiliary support bearing 7 radially engages on the inner side a centring pin 227, provided on the auxiliary body 220, and radially on the outer side, the inner surface of the command portion of the shaft 5.

According to a preferred embodiment, the upper auxiliary support bearing 7 is housed inside the shaft 5 and closes the air duct 50, facilitating the outflow of the blow-by gases.

According to a preferred embodiment, the upper auxiliary support bearing 7 is mounted outside the command shaft 5.

According to a preferred embodiment, the blow-by gas filtration assembly 1 also comprises a second lower auxiliary support bearing 8.

Preferably, the lower auxiliary support bearing 8 is suitable to ensure the centring of the shaft 5 on the X-X axis so that it is centred with the stator axis.

Preferably, the lower auxiliary support bearing 8 is placed proximal to the second filter plate 32.

According to a preferred embodiment, the lower auxiliary support bearing 8 is engaged to the second filter plate 32.

According to a further preferred embodiment, the lower auxiliary support bearing 8 is engaged to the shaft 5, preferably at the filter portion 53.

For example, the lower auxiliary support bearing 8 is engaged to the shaft 5, at an end thereof which overruns through the second plate opening 320 and is engaged to the assembly body 2, preferably at the main body 210.

According to the present invention, the terms support bearing, upper auxiliary support bearing and lower auxiliary support bearing mean both sliding bearings and roller bearings.

According to a preferred embodiment, the engagement of the bearings with the shaft and with the respective support body is sealed.

According to a preferred embodiment, the shaft 5 is made of thermoplastic material obtained by means of a single moulding operation.

Preferably, the shaft 5 is made of polyphenylene sulphide (PPS).

Preferably, the shaft 5 is made of a polyphenylene sulphide (PPS) based material.

Preferably, the shaft 5 is made of a polyphenylene sulphide (PPS) based material reinforced with fibreglass (PPS+GF15, PPS+GF30, PPS+GF40).

Preferably, the shaft 5 is made of a nylon-based material (PA, PA 6, PA 6.6 or a mixture thereof).

Preferably, the shaft 5 is made of nylon-based material reinforced with fibreglass. (PA+GF, PA 6.6+GF35, PA 6+PA 6.6+GF 35)

Preferably, the shaft 5 is made of a material comprising a polyamide-based compound (e.g. PPA).

According to a preferred embodiment, the shaft 5 is made of metal. Preferably, the shaft 5 is made of aluminium alloy.

Innovatively, the blow-by gas filtration assembly of the present invention widely fulfils the purpose of the present invention. Innovatively, the blow-by gas filtration assembly presents a new and innovative shape, but above all a new and innovative support and engagement method of the various components.

Advantageously, the filtration assembly of the blow-by gases has a simply structured shaft and is therefore simple to produce.

Advantageously, the filtration assembly uses an abutment surface provided by a component operatively coupled to the shaft (such as the bearing) to ensure a preset torque of the threaded coupling, thus simplifying the structure of the shaft and making the filtration assembly more compact.

Advantageously, the filtration assembly uses an abutment surface provided by the support bearing operatively coupled to the shaft, which, being a lubricated component, reduces the friction generated by rotation and therefore the stresses on the electric drive, making the assembly more reliable.

Advantageously, the support bearing is positioned in a certain position. In particular, advantageously, the support bearing is positioned on the shaft in a certain position. In particular, advantageously, the support bearing is positioned on the assembly body in a certain position.

Advantageously, the alignment between the rotation axis of the filter group and the rotation axis of the electric motor is guaranteed without the use of additional alignment/compensation elements.

Advantageously, the rotation axis of the filter group and the rotation axis of the electric motor are always aligned with each other. Advantageously, the blow-by gas filtration assembly has extremely compact dimensions.

Advantageously, the assembly body is designed to identify and fluidically separate the filtration chamber from the outflow chamber in a simple and effective manner. Advantageously, the assembly body comprises the main body and the auxiliary body, the mutual engagement of which defines said chambers.

Advantageously, the blow-by gas filtration assembly has an extremely limited number of components. Advantageously, the blow-by gas filtration assembly has fewer components for alignment and rotation than the prior solutions.

Advantageously, the blow-by gas filtration assembly has a limited number of gaskets. Advantageously, the filter group axially and sealingly engages the support bearing allowing the elimination of additional gaskets between the shaft and the filter group.

Advantageously, the threaded coupling simplifies the assembly of the filtration assembly.

Advantageously, the threaded coupling between the shaft and filter group allows the support bearing to be axially locked in the correct working position, eliminating the need for additional components for such purpose.

Advantageously, the region of reciprocal engagement between the filter group and the shaft is very compact, thus making it possible to optimise the use of available space by offering, for example, the possibility of increasing the filtering surface area of the filter group and therefore, with the same flow rate of gas to be filtered, reducing the pressure drops imposed by the filtration assembly on the crankcase ventilation circuit.

Advantageously, the threaded coupling simplifies and makes the assembly of the filtration assembly more reliable, allowing the filter group to be assembled to the shaft, which in turn is coupled to the electric drive and supported by the auxiliary body, then joining said auxiliary body to the main body in sequence, without the need to use additional components to ensure alignment between the rotation axis of the filter group and the rotation axis of the electric drive.

Advantageously, the filtration assembly of the present invention guarantees compliance with the dimensional tolerances related to the mechanical coupling between the auxiliary body (e.g. electric motor) and the main body of the assembly body and at the same time guarantees the alignment between the axis of rotation of the electric motor and the axis of rotation of the shaft, and therefore of the filter group.

Advantageously, the preset torque of the threaded coupling on the support bearing provided between the shaft and the filter group makes it possible to minimise clearance along the shaft axis, reducing stresses on the components that make the filter group rotate and thus prolonging the service life of the components included in the assembly.

Advantageously, the preset torque of the threaded coupling on the support bearing makes it possible to support and at the same time rotate the filter element, reducing the number of components required for this purpose and therefore the weight of the assembly, thus helping to increase its reliability.

Advantageously, the preset torque of the threaded coupling on the support bearing makes it possible to reduce the number of components and the weight of the filtration assembly, thus reducing the power of the electric drive, simplifying its structure and reducing its costs.

Advantageously, the reduction in weight of the assembly makes it possible to contribute to the construction of lighter vehicles and thus reduce fuel consumption.

Advantageously, the threaded coupling realised with the screwing direction opposite the main direction of rotation of the command shaft during filtration operations prevents the undesired disengagement of the filter group, thus realizing a safe and self-closing fixing system.

Advantageously, the threaded coupling simplifies service and maintenance of the filter element, also making it safer and cleaner.

Advantageously, the threaded coupling can be made hydraulically sealed, avoiding the use of any additional seals fitted on the filter group or command shaft, further simplifying the assembly and making it lighter, more reliable and less expensive.

art may make modifications to the blow-by gas filtration assembly so as to satisfy contingent requirements, all contained within the scope of protection as defined by the following claims.

LIST OF REFERENCE NUMBERS 1 blow-by gas filtration assembly
2 assembly body
20 filtration chamber
21 inlet mouth
22 outlet mouth
210 main body
212 housing wall
214 abutment step
220 auxiliary body
220' stator housing
221 bottom wall
222 collar wall
223 top wall
225 body window
227 centring pin
250 outflow chamber
3 filter group
30 filter medium
31 first filter plate
310 first plate opening
316 annular shoulder
32 second filter plate
320 second plate opening
33 central structure
330 central radial through opening
34 outer structure
340 outer radial through opening
38 filter thread
300 cavity
4 electric drive
40 electric motor unit
41 stator
42 rotor
49 electric connector
50 shaft
50 air duct
52 outflow portion
520 shaft abutment element
525 outflow window
53 filter portion
530 central air intake
535 radial opening
538 shaft thread
539 anti-rotation element
54 command portion
56 support portion
6 support bearing
61 innerbearing ring
62 outer bearing ring
7 upper auxiliary support bearing
8 lower auxiliary support bearing
X-X rotation axis

The invention claimed is:

1. A blow-by gas filtration assembly, fluidically connectable to a crankcase ventilation circuit of an internal combustion engine in order to receive the blow-by gases and to filter suspended particles from the blow-by gases, wherein the filtration assembly has an axis and comprises:
   an assembly body comprising a filtration chamber, an inlet mouth for the blow-by gases to be filtered and an outlet mouth for the filtered blow-by gases;
   ii) a filter group comprising a central cavity configured to be radially crossed by the blow-by gases;
   iii) an electric drive (4) that is operatively connected to the filter group in order to command in rotation about the axis and to carry out filtration operations, wherein the electric drive comprises an electric motor, the electric motor comprising a stator and a rotor;
   iv) a support and command shaft, which extends along the axis and comprises:
   a filter portion on which the filter group is mounted;
   a command portion on which the rotor is mounted; and
   a support portion is axially positioned between the filter portion and the command portion;
   v) a support bearing radially engaged to said support portion on an inside and to the assembly body on an outside;
   wherein the filter group and the filter portion comprise a filter thread and a shaft thread, respectively, screwable to one another, wherein the filter group screwed to the shaft axially engages with the support bearing, wherein said axial engagement between the filter group and support bearing prevents additional screwing of the filter group.

2. The blow-by gas filtration assembly according to claim 1, wherein the support bearing comprises an inner bearing ring radially engaged with said support portion and an outer bearing ring engaged with the assembly body, wherein the filter group comprises an annular shoulder engageable with said inner bearing ring.

3. The blow-by gas filtration assembly according to claim 1, wherein the support bearing is positioned on the shaft in a set axial position and wherein the filter group is engaged on one side and wherein the rotor or at least one shaft abutment element or the assembly body is engaged on the other side.

4. The blow-by gas filtration assembly according to claim 1, wherein the shaft internally comprises an air duct through which the blow-by gases flow, wherein the filter portion is fluidically connected to the cavity.

5. The blow-by gas filtration assembly according to claim 4, wherein the shaft further comprises:

an outflow portion axially positioned between the filter portion and the command portion, wherein said outflow portion is fluidically connected to the air duct and comprises at least one outflow window through which the blow-by gases flow.

6. The blow-by gas filtration assembly according to claim 5, wherein the support portion is axially positioned between the filter portion and the outflow portion.

7. The blow-by gas filtration assembly according to claim 5, wherein the outflow portion comprises a plurality of outflow windows arranged in the shape of a ring around the axis, wherein each window is separated from the consecutive window by a shaft abutment element.

8. The blow-by gas filtration assembly according to claim 1, wherein the filter group comprises a filtering medium, a first plate filter and a second plate filter that are respectively positioned at ends of the filtering medium.

9. The blow-by gas filtration assembly according to claim 8, wherein the filter group comprises a central structure that is housable in the cavity.

10. The blow-by gas filtration assembly according to claim 8, wherein the second plate filter is closed and the shaft passes through the first plate along the axis by passing through a respective first plate opening, and comprises at least one air inlet mouth on the filter portion, through which the blow-by gases flow.

11. The blow-by gas filtration assembly according to claim 8, wherein the second plate filter has a second plate opening, wherein the shaft passes through said second plate opening along the axis.

12. The blow-by gas filtration assembly according to claim 11, wherein the shaft extends axially to pass through the second plate opening, wherein the assembly for filtering blow-by gases comprises a lower auxiliary support bearing engaged with said axial end portion that protrudes through the second plate opening.

13. The blow-by gas filtration assembly according to claim 1, wherein the shaft comprises an anti-rotation element.

14. The blow-by gas filtration assembly according to claim 1, comprising an upper auxiliary support bearing that is engaged with the shaft in the command portion.

15. The blow-by gas filtration assembly according to claim 1, wherein the filter group is screwed to the shaft in a direction of rotation that is counter to a direction of rotation in which the shaft and the filter group is commanded in rotation by the electric drive during the filtering processes.

16. The blow-by gas filtration assembly according to claim 1, wherein the assembly body comprises a main body and an auxiliary body that are sealingly engageable with one another along the axis to hermetically delimit the filtration chamber, wherein the filter group is houseable in the main body and the electric drive is houseable in the auxiliary body.

17. The blow-by gas filtration assembly according to claim 16, wherein, when coupled to one another, the main body and the auxiliary body delimit an outflow chamber through which the blow-by gases flow.

18. The blow-by gas filtration assembly according to claim 1, wherein the central cavity of the filter group is configured to be radially crossed by from outside to inside by the blow-by gases.

19. The blow-by gas filtration assembly according to claim 4, wherein the shaft further comprises an outflow portion axially positioned between the filter portion and the command portion, wherein said outflow portion is fluidically connected to the air duct and comprises at least one outflow window through which the blow-by gases flow towards the outlet mouth.

20. The blow-by gas filtration assembly according to claim 8, wherein the filter group comprises a central structure that is housable in the cavity and is configured for connecting the first plate filter and the second plate filter, comprising radial through-holes through which the blow-by gases flow, wherein the filter thread is positioned on the first plate filter or on the second plate filter or on the central structure.

21. The blow-by gas filtration assembly according to claim 1, wherein the shaft comprises an anti-rotation element in the filter portion, configured to perform an action in the radial direction in order to engage with the filter group screwed to the shaft and to prevent the unwanted unscrewing of the threaded coupling.

* * * * *